(12) United States Patent
Freitag

(10) Patent No.: US 11,248,633 B2
(45) Date of Patent: Feb. 15, 2022

(54) CONNECTION, CONNECTION SYSTEM, AND METHOD FOR CONNECTING AT LEAST TWO COMPONENTS

(71) Applicant: Bayerische Motoren Werke Aktiengesellschaft, Munich (DE)

(72) Inventor: Norman Freitag, Ainring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 15/896,538

(22) Filed: Feb. 14, 2018

(65) Prior Publication Data

US 2018/0172042 A1    Jun. 21, 2018

Related U.S. Application Data

(63) Continuation of application No. PCT/EP2016/073051, filed on Sep. 28, 2016.

(30) Foreign Application Priority Data

Oct. 13, 2015 (DE) .................. 10 2015 219 756.5

(51) Int. Cl.

| | | |
|---|---|---|
| *F16B 1/00* | (2006.01) | |
| *F16B 17/00* | (2006.01) | |
| *B62D 21/12* | (2006.01) | |
| *B62D 27/06* | (2006.01) | |
| *F16B 2/00* | (2006.01) | |
| *B29C 65/76* | (2006.01) | |

(52) U.S. Cl.
CPC ............ *F16B 1/0014* (2013.01); *B62D 21/12* (2013.01); *B62D 27/06* (2013.01); *F16B 17/008* (2013.01); *B29C 65/76* (2013.01); *F16B 2/005* (2013.01)

(58) Field of Classification Search
CPC ...... F16B 1/0014; F16B 2/005; F16B 17/008; B62D 27/06; B62D 21/12; B29C 65/76
USPC ............. 156/73.1; 428/172, 413, 99; 24/442
See application file for complete search history.

(56) References Cited

U.S. PATENT DOCUMENTS

| | | |
|---|---|---|
| 6,598,274 B1 | 7/2003 | Marmaropoulos |
| 6,773,535 B1 | 8/2004 | Wetzel |
| 8,231,755 B2 | 7/2012 | Xie et al. |
| 8,250,725 B2 * | 8/2012 | Sigler .................... B29C 61/02 29/447 |

(Continued)

FOREIGN PATENT DOCUMENTS

| | | |
|---|---|---|
| CN | 101643632 A | 2/2010 |
| DE | 603 01 192 T2 | 6/2006 |

(Continued)

OTHER PUBLICATIONS

English-language translation of Chinese Office Action issued in counterpart Chinese Application No. 201689035615.5 dated Dec. 25, 2018 (nine (9) pages).

(Continued)

*Primary Examiner* — Marc C Howell
*Assistant Examiner* — Abhishek A Patwardhan
(74) *Attorney, Agent, or Firm* — Crowell & Moring LLP

(57) ABSTRACT

A connection between at least two components of a motor vehicle includes at least one connection unit which is arranged and/or formed on one of the components, and provides at least one connection surface of the connection. At least one characteristic of the connection unit is deliberately changeable, in such a manner that an adhesion capability of the connection surface is adjustable.

5 Claims, 1 Drawing Sheet

(56) References Cited

U.S. PATENT DOCUMENTS

| | | | |
|---|---|---|---|
| 2004/0074061 A1* | 4/2004 | Ottaviani | B64C 33/02 |
| | | | 24/442 |
| 2004/0074062 A1 | 4/2004 | Stanford, Jr. et al. | |
| 2008/0257094 A1 | 10/2008 | Xie et al. | |
| 2009/0280330 A1* | 11/2009 | Xie | C09J 7/35 |
| | | | 428/413 |
| 2010/0080951 A1 | 4/2010 | Del Campo Becares et al. | |
| 2010/0098932 A1 | 4/2010 | Xie et al. | |
| 2012/0258287 A1 | 10/2012 | Arzt et al. | |
| 2013/0157104 A1* | 6/2013 | Ulicny | H01M 2/34 |
| | | | 429/121 |
| 2015/0086791 A1* | 3/2015 | Browne | B32B 7/12 |
| | | | 428/414 |
| 2015/0344755 A1 | 12/2015 | Schneider et al. | |
| 2016/0284449 A1* | 9/2016 | Haq | B29C 65/1425 |

FOREIGN PATENT DOCUMENTS

| | | |
|---|---|---|
| DE | 10 2006 033 495 A1 | 1/2008 |
| DE | 10 2006 050 365 A1 | 4/2008 |
| DE | 10 2009 035 621 A1 | 3/2010 |
| DE | 10 2009 048 704 A1 | 4/2010 |
| DE | 10 2009 058 651 A1 | 6/2011 |
| DE | 10 2012 112 965 A1 | 6/2014 |
| DE | 10 2013 105 803 A1 | 8/2014 |
| DE | 10 2013 114 332 A1 | 6/2015 |

OTHER PUBLICATIONS

International Search Report (PCT/ISA/210) issued in PCT Application No. PCT/EP2016/073051 dated Dec. 6, 2016 with English translation (seven pages).

German-language Written Opinion (PCT/ISA/237) issued in PCT Application No. PCT/EP2016/073051 dated Dec. 6, 2016 (six pages).

German-language Search Report issued in counterpart German Application No. 10 2015 219 756.5 dated Aug. 9, 2016 with partial English translation (12 pages).

\* cited by examiner

CONNECTION, CONNECTION SYSTEM, AND METHOD FOR CONNECTING AT LEAST TWO COMPONENTS

CROSS REFERENCE TO RELATED APPLICATIONS

This application is a continuation of PCT International Application No. PCT/EP2016/073051, filed Sep. 28, 2016, which claims priority under 35 U.S.C. § 119 from German Patent Application No. 10 2015 219 756.5, filed Oct. 13, 2015, the entire disclosures of which are herein expressly incorporated by reference.

BACKGROUND AND SUMMARY OF THE INVENTION

Embodiments of the invention relate to a connection between at least two components, in particular of a motor vehicle, including at least one connection unit which is arranged and/or formed on one of the components and provides at least one connection surface of the connection. The embodiments of the invention also relate to a connection system for connecting at least two components, in particular of a motor vehicle, and to a method for connecting at least two components, in particular of a motor vehicle.

In order to connect two components to each other, mechanical connection types that are non-destructively detachable and not non-destructively detachable may be used. A connection that is non-destructively detachable may be realized for example by a threaded connection, a hook and loop fastener or the like, while a connection that is not non-destructively detachable may be created for example by a rivet connection, a welded connection, an adhesive bond or the like. In general, connections that are non-destructively detachable can be detached again by reversing the respective connection process, whereas connections that are not non-destructively detachable can only be detached by destroying the respective connecting means and/or the components that have been connected to each other in a corresponding manner. As a rule, connections which are not non-destructively detachable do not allow the replacement of damaged parts and make it difficult to recycle individual connection components.

DE 10 2012 112 965 A1 relates to an object having at least one surface with selectable adhesion. The surface comprises at least one shape memory alloy, coated at least partly with at least one polymer. The shape memory alloy may form a surface structure by which the surface of the object and consequently the area available for adhesion and the adhesion capability of the surface are changed.

DE 10 2006 050 365 A1 discloses a structured surface of a solid body which comprises a multiplicity of projections, which form a contact area having an adhesion capability relative to adjacent surroundings, and a carrier layer on which the projections are arranged. Properties of the projections and/or of the carrier layer are specifically variable in such a way that the adhesion capability of the contact area is adjustable.

U.S. Pat. No. 6,773,535 B1 discloses a connection between two components, wherein a shape memory alloy element is arranged between connection sections of the components and is adhesively bonded to both connection sections. The shape memory alloy element is adhesively bonded to the connection sections in a stressed condition. In order to separate the connection, the shape memory alloy element is actively switched to an unstressed condition by increasing the temperature of the shape memory alloy element, thereby weakening the adhesive bonds between the shape memory alloy element and the connection sections. This enables the components to be separated from each other. The connection is detached in a manner that is not non-destructive.

An object of the embodiments of the invention is to provide an improved connection between components that can be detached non-destructively.

This and other objects are achieved by a connection between at least two components of a motor vehicle, including at least one connection unit which is arranged and/or formed on one of the components and provides at least one connection surface of the connection, in which at least one characteristic of the connection unit is deliberately changeable, in such a manner that an adhesion capability of the connection surface is adjustable.

The adhesion capability of the connection surface of the connection unit and therewith the connecting force realized by the inventive connection may be varied. This makes it possible to keep the adhesion capability of the connection surface as low as possible initially during assembly, thus enabling simple and precise positioning of the components in their respective connection positions relative to each other. When the components are in their connection positions, the adhesion capability of the connection surface may be increased, so that the components are firmly connected to one another. In order to detach the connection non-destructively, the adhesion capability of the connection surface may be deliberately reduced.

For example a connection principle is known in which at least one metal ball is welded onto one component, onto which metal ball a further component may be clipped or onto which the further component may be pushed. In order to be able to guarantee a reliable and permanent transfer of force via the component connection created in this way, the two components that are connected to each other must additionally be screwed, adhesively bonded or otherwise connected to each other in a fixed manner. However, if the further component is pushed onto the metal ball, it cannot be adhesively bonded to the component that has the metal ball, since otherwise the adhesive would be pushed down by the component during the joining process. Therefore, an additional fixation of the components that are connected to each other can only be achieved conventionally by means of a screw connection, but this is unfavorable in the case of visible and decorative components, since the screw heads are either visible or additional effort must be expended to countersink and conceal them. In contrast to this, the adhesion capability of the connection surface may be reduced and/or to some degree neutralized during assembly by a variation or adjustment of the adhesion capability of the connection surface according to the invention as described previously, and the component may be pushed onto the metal balls without difficulty. When the components are subsequently located in their connection positions relative to each other, the adhesion capability of the connection surface may be increased and/or to some degree activated, so that the two components are securely and permanently connected to each other.

The inventive connection is able to replace practically all prior connection types. The selectable adhesion capability of the connection surface offers the advantage of guaranteeing a secure and permanent connection of the components without leaving unwelcome screw heads visible. At the same time, particularly in contrast to an adhesive bond, the connection is detachable easily and at a desired point in time, so that the parts used in component connections may be recycled to a greater degree than previously thought possible.

By virtue of the selectable adhesion capability of the connection surface, the inventive connection also makes assembly work and particularly the replacement of damaged components much easier precisely in the service and after-sales area. In particular, with the inventive connection entirely new connection capabilities can be created between components, since even components that until now have been connected to each other in a destructively detachable manner can be replaced easily and quickly, without destruction thereof, when the inventive connection is implemented.

The connection unit may be designed such that the adhesion capability of the connection surface is reduced by a deliberate, active exposure of the connection element to at least one external physical and/or chemical influencing factor, and/or that the desired greater adhesion capability of the connection surface is assured without such an active exposure of the connection element.

Moreover, three or more components may be connected to each other with the inventive connection. In particular, components of a motor vehicle, particularly chassis components may be connected to each other with the inventive connection.

The connection unit may be produced from a shape memory alloy. It may also be possible for two or more in particular physical or geometric characteristics of the connection unit to be deliberately changeable in such a manner that an adhesion capability of the connection surface is adjustable. The connection unit may also provide two or more connection surfaces whose adhesion capabilities are adjustable jointly or individually. It is also possible for two or more connection units to be arranged on one component.

The arrangement and/or formation of the connection unit on the component may be carried out in a production, forming and/or assembly process. In this context, the connection unit may be arranged and/or formed on the component with a depositing process, for example rolling, compressing, spraying, bonding, sputtering, overmolding, casting, recasting, an additive production method or the like, with an activation process, for example with the effect of temperature, electromagnetic radiation, particularly light, a chemical medium, a mechanical pressure, an electrical field or a magnetic field, or with an erosion process, for example mechanical erosion, thermal erosion, chemical erosion or electrochemical erosion.

An inventive connection system for connecting at least two components of a motor vehicle, includes at least one connection according to one of the aforementioned variants or a combination of any such variants and at least one control and/or regulating unit which is configured to deliberately expose the connection unit of the connection to at least one external influencing factor in such a manner that the at least one characteristic of the connection unit is deliberately changeable for adjusting the adhesion capability of the connection surface of the connection unit.

The advantages described above with respect to the connection are associated correspondingly with the connection system. The external influencing factor may be of a physical and/or chemical nature. For example, the external influencing factor may be an electrical field, a magnetic field, an electromagnetic radiation, a mechanical pressure, a chemical medium or a temperature. Two or more corresponding external influencing factors may also be combined with each other to enable the adhesion capability of the connection surface to be adjusted. The external influencing factor may be derived either from an ambient situation when a motor vehicle is in operation, for example from an air temperature in the motor vehicle's radiator, from an active exposure of the connection unit to the external influencing factor by means of an electronic vehicle control unit, or from a combination thereof.

The control and/or regulating unit may be configured to deliberately expose the connection unit to the at least one external influencing factor depending on a detected current or a predetermined driving state of the motor vehicle. In this way it is possible for example to control a local rigidity of the motor vehicle while the motor vehicle is driving, and thereby improve the driving dynamics of the motor vehicle. The components which are connected to each other via the connection may be unconnected or only loosely connected to each other via the connection in a comfort mode, for example, that is to say in a predetermined driving state, and thus provide a more flexible chassis and increased comfort for the driver. For this purpose, the adhesion capability of the connection surface may be deliberately reduced. In a sporting mode, that is to say another predetermined driving state, and these components may be connected by increased adhesion capability of the connection surface to form an assembly with greater rigidity, thereby obtaining improved and sportier driving dynamics. The inventive connection thus enables flexible joining and detachment of two components that are connected to each other via the connection while a motor vehicle is being driven. A low-distortion tolerance compensation of two components which are connected to each other via the connection may be achieved through partial detachment of connections before, during and/or after the motor vehicle has been driven. Moreover, various expansions of components which are connected to each other via the connection may be compensated for by temporary detachment of the connection, as a result of which stresses and deformations of the components before and/or after driving, in a parking situation for example may be reduced. The variation of the adhesion capability of the inventive connection surface may alternatively or additionally be automated depending on the respective detected current driving state of the motor vehicle.

The control and/or regulating unit may be configured to deliberately expose the connection unit to the at least one external influencing factor depending on a detected current acoustic behavior of the motor vehicle. This enables an acoustic optimization of the motor vehicle to take place by suppression of noises. In particular, based on a temporary connection and detachment of two components that are connected to each other via the connection the connection may serve as a switching element in a regulating circuit, thus opening up new possibilities in the acoustic design of a motor vehicle. The variation of the adhesion capability of the connection surface may be automated depending on the respective detected current acoustic behavior of the motor vehicle.

An inventive method for connecting at least two components of a motor vehicle, includes the acts of: arranging and/or forming at least one connection unit on one of the components which are not connected to each other, which connection unit provides at least one connection surface and of which at least one characteristic is changeable by deliberate exposure to at least one external influencing factor in such a manner that an adhesion capability of the connection surface is adjustable; reducing the adhesion capability of the connection surface to a predetermined first level by deliberate exposure of the connection unit to a predetermined first value of the at least one external influencing factor; positioning the components that are to be connected to each other in their respective connection positions relative to each other in such a manner that the connection surface directly contacts the respective other component; and increasing the adhesion capability of the connection surface to a predetermined second level, which is greater than the first level, by deliberately exposing the connection unit to a predetermined second value of the at least one external influencing factor, wherein the second value differs from the first value.

The advantages described above with respect to the inventive connection and the inventive connection system are associated correspondingly with the method. The arrangement and/or formation of the connection unit on one of the components which are not connected to each other may be carried out in a production, forming and/or assembly process. In this context, the connection unit may be arranged and/or formed on the component with a depositing process, an activation process or an erosion process. Within the scope of the invention, a first value and a second value of the at least one external physical and/or chemical influencing factor are understood to be for example a current absolute value of the influencing factor, for example a pressure value or a temperature value, or a certain characteristic, for example a frequency of an electromagnetic radiation or chemical characteristic of a medium, of the influencing factor.

The deliberate exposure of the connection unit to a predetermined first value of the at least one external influencing factor may take place actively, and the deliberate exposure of the connection unit to a predetermined second value of the at least one external influencing factor may take place passively. In this way, the temporary, at least partial detachment of the connection or reduction of the adhesion capability of the connection surface takes place actively, whereas the temporary strengthening of the connection or increase in the adhesion capability of the connection surface takes place passively.

After the components have been connected to each other, the connection unit may be deliberately exposed to the at least one external influencing factor depending on a detected current or a predetermined driving state of the motor vehicle. The advantages described above with respect to the respective variant of the connection system are associated correspondingly with this variant. In particular, this enables the rigidity of the motor vehicle to be varied according to a desired driving mode of the motor vehicle.

After the components have been connected to each other, the connection unit may be deliberately exposed to the at least one external influencing factor depending on a detected current acoustic behavior of the motor vehicle. The advantages described above with respect to the respective variant of the connection system are associated correspondingly with this variant. In particular, this enables the motor vehicle to be acoustically optimized.

Other objects, advantages and novel features of the present invention will become apparent from the following detailed description of one or more preferred embodiments when considered in conjunction with the accompanying drawings, in which:

DETAILED DESCRIPTION OF THE DRAWINGS

Figure 1:
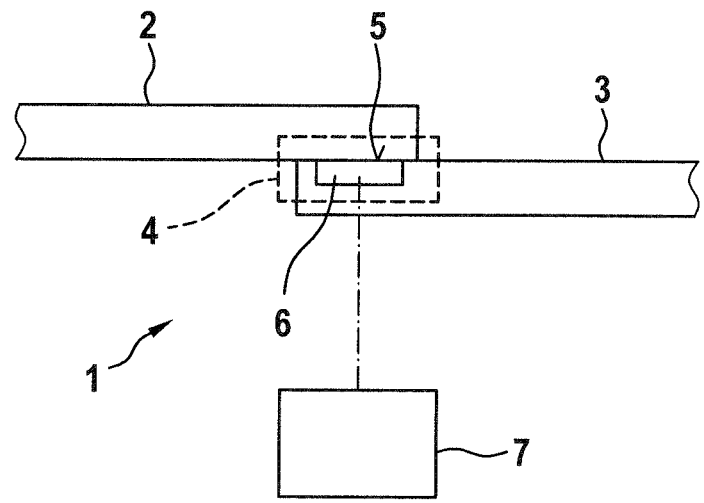
FIG. 1 shows a schematic representation of an exemplary embodiment of the inventive connection system.

FIG. 1 shows a schematic representation of an exemplary embodiment of an inventive connection system 1 for connecting two components 2 and 3 of a motor vehicle—not further shown.

The connection system 1 comprises a connection 4 between components 2 and 3. The connection 4 comprises a connection unit 6 which is arranged and/or formed on the component 3, and provides at least one connection surface 5 of the connection 4. At least one characteristic of the connection unit 6 is deliberately changeable, in such a manner that an adhesion capability of the connection surface 5 is adjustable.

The connection system 1 further comprises a control and/or regulating unit 7 which is configured to deliberately expose the connection unit 6 of the connection 4 to the at least one external influencing factor in such a manner that the at least one characteristic of the connection unit 6 is deliberately changeable for adjusting the adhesion capability of the connection surface 5 of the connection unit 6.

The control and/or regulating unit 7 may be configured to deliberately expose the connection unit 6 to the at least one external influencing factor depending on a detected current or a predetermined driving state of the motor vehicle. Alternatively or additionally, the control and/or regulating unit 7 may be configured to deliberately expose the connection unit 6 to the at least one external influencing factor depending on a detected current acoustic behavior of the motor vehicle.

Figure 2:
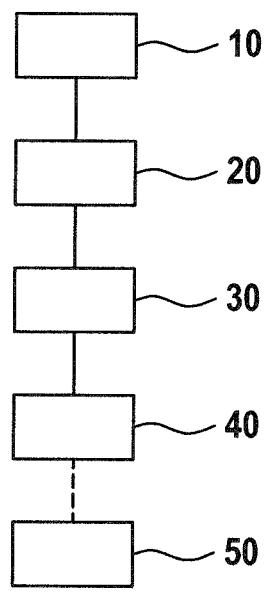
FIG. 2 shows a representation of an exemplary workflow for the inventive method.

FIG. 2 shows a representation of an exemplary workflow for the inventive method for connecting at least two components of a motor vehicle. A connection system as shown in FIG. 1 may be used to carry out the method.

In a first assembly step 10, at least one connection unit is arranged and/or formed on one of the components which are not connected to each other, which connection unit provides at least one connection surface and of which at least one characteristic is changeable by deliberate exposure to at least one external influencing factor in such a manner that an adhesion capability of the connection surface is adjustable.

In a second assembly step 20, the adhesion capability of the connection surface is reduced to a predetermined first level by deliberate exposure of the connection unit to a predetermined first value of the at least one external influencing factor.

In a third assembly step 30, the components that are to be connected to each other are positioned in their respective connection positions relative to each other in such a manner that the connection surface directly contacts the respective other component.

In a fourth assembly step 40, the adhesion capability of the connection surface is increased to a predetermined second level, which is greater than the first level, by deliberately exposing the connection unit to a predetermined second value of the at least one external influencing factor, wherein the second value differs from the first value. In this context, the deliberate exposure of the connection unit to a predetermined first value of the at least one external influencing factor may take place actively and the deliberate exposure of the connection unit to a predetermined second value of the at least one external influencing factor may take place passively. Then, the components are connected to each other in a fixed manner.

In a subsequent method step 50, after the components have been connected to each other, the connection unit is deliberately exposed to the at least one external influencing factor depending on a detected current or a predetermined driving state of the motor vehicle. Alternatively or additionally in method step 50, after the components have been connected to each other, the connection unit may be deliberately exposed to the at least one external influencing factor depending on a detected current acoustic behavior of the motor vehicle.

LIST OF REFERENCE SIGNS

1 Connection system
2 Component
3 Component
4 Connection
5 Connection surface
6 Connection unit
7 Control and/or regulating unit
10 First assembly step
20 Second assembly step
30 Third assembly step
40 Fourth assembly step
50 Method step The foregoing disclosure has been set forth merely to illustrate the embodiments of the invention and is not intended to be limiting. Since modifications of the disclosed embodiments incorporating the spirit and substance of the invention may occur to persons skilled in the art, the embodiments of the invention should be construed to include everything within the scope of the appended claims and equivalents thereof.

What is claimed is:

1. A connection system configured to connect at least two components of a motor vehicle, comprising:
    at least one control unit; and
    at least one connection unit which is operatively coupled to the at least one control unit, and which is arranged on the at least two components, wherein
        the at least two components have at least one connection therebetween,
        the at least one connection has at least one connection surface,
        at least one property of the connection unit is variable in a targeted manner in such a way that an adhesion property of the connecting surface is setable,
        the at least one control unit is configured to load the at least one connection unit of the at least one connection with at least one external influencing variable in a targeted manner in such a way that the at least one property of the connection unit is variable in a targeted manner in order to set the adhesion of the at least one connection surface of the at least one connection unit, and
        the at least one control unit is configured to load the at least one connection unit in a targeted manner with the at least one external influencing variable in a manner that depends on a detected instantaneous acoustic behavior of the motor vehicle.

2. The connection according to claim 1, wherein the at least one control unit is configured to load the at least one connection unit in a targeted manner with the at least one external influencing variable in a manner that depends on a detected instantaneous or a predetermined driving state of the motor vehicle.

3. A method for the connection of at least two components of a motor vehicle, comprising:
    arranging at least one connection unit on one of the at least two components, which are not connected to one another, which connection unit providing at least one connection surface, and by which connection unit at least one property is variable by way of targeted loading with at least one external influencing variable in such a way that an adhesion of the connection surface is setable;
    decreasing the adhesion capability of the connection surface to a predefined first level by way of targeted loading of the connection unit with a predefined first value of the at least one external influencing variable;
    positioning the at least two components which are to be connected to one another in their respective connection positions relative to one another in such a way that the connection surface makes direct contact with the respective other component; and
    increasing the adhesion capability of the connection surface to a predefined second level, which is greater than the first level, by way of targeted loading of the at least one connection unit with a predefined second value of the at least one external influencing variable, the second value differing from the first value, wherein
        after the connection of the components to one another is carried out, the at least one connection unit is loaded in a targeted manner with the at least one external influencing variable in a manner which is dependent on a detected instantaneous acoustic behavior of the motor vehicle.

4. The method according to claim 3, wherein the targeted loading of the at least one connection unit with a predefined first value of the at least one external influencing variable takes place in an active manner, and the targeted loading of the at least one connection unit with a predefined second value of the at least one external influencing variable takes place in a passive manner.

5. The method according to claim 4, wherein after the connection of the components to one another is carried out, the connection unit is loaded in a targeted manner with the at least one external influencing variable in a manner which is dependent on a detected instantaneous or a predefined driving state of the motor vehicle.

\* \* \* \* \*